(12) United States Patent
Forsberg et al.

(10) Patent No.: US 6,242,112 B1
(45) Date of Patent: Jun. 5, 2001

(54) USE OF A NI-BASE ALLOY FOR COMPOUND TUBES FOR COMBUSTION PLANTS

(75) Inventors: Urban Forsberg; Anders Wilson, both of Sandviken (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 09/242,631
(22) PCT Filed: Aug. 26, 1997
(86) PCT No.: PCT/SE97/01417
  § 371 Date: May 6, 1999
  § 102(e) Date: May 6, 1999
(87) PCT Pub. No.: WO98/09751
  PCT Pub. Date: Mar. 12, 1998

(30) Foreign Application Priority Data

Sep. 5, 1996 (SE) .................................. 9603220

(51) Int. Cl.⁷ ........................................ F16L 9/02
(52) U.S. Cl. ................. 428/679; 428/680; 428/937; 138/143; 420/453
(58) Field of Search .................. 428/679, 685, 428/680, 553, 937; 138/143, 145, 146, 142; 420/453

(56) References Cited

U.S. PATENT DOCUMENTS

| | | | |
|---|---|---|---|
| 3,753,704 | * 8/1973 | Manilla et al. | 75/208 R |
| 4,943,489 | * 7/1990 | Kuhara et al. | 428/586 |
| 5,190,832 | * 3/1993 | Ogawa et al. | 428/678 |
| 5,194,222 | * 3/1993 | Ogawa et al. | 420/585 |
| 5,879,818 | * 3/1999 | Kinomura et al. | 428/636 |
| 6,010,581 | * 1/2000 | Rosen et al. | 148/428 |

FOREIGN PATENT DOCUMENTS

| | | | |
|---|---|---|---|
| 19536978 A1 | * 4/1996 | (DE) | . |
| 0221634 | 5/1987 | (EP) | . |
| 2-296088 | * 12/1990 | (JP) | . |
| 7-242971 | * 9/1995 | (JP) | . |
| 9-256089 | * 9/1997 | (JP) | . |
| 9-256090 | * 9/1997 | (JP) | . |
| 9531579 | 11/1995 | (WO) | . |

OTHER PUBLICATIONS

International Conference on Spray Forming, Sep. 13–15, 1993, Wahlroos, J.M., "Interface Adherence of Spray Formed Compound Tube", 1993 Swansea, Editor John V. Woods (No Month).

* cited by examiner

Primary Examiner—John J. Zimmerman
(74) Attorney, Agent, or Firm—Burns, Doane, Swecker & Mathis, L.L.P.

(57) ABSTRACT

As tube material in waste incineration it has been found advantageous to use a composite tube wherein an inner tube component of a carbon steel or a low-alloy Cr—Mo-steel is metallurgically bonded to an outer tube component of Ni—Cr—Mo—Nb—Fe-alloy with an austenitic structure. The composite tube is fabricated by spraying finely distributed metal drops of the outer component onto the inner component in melt condition. After solidifying, the composite tube is then fabricated by joint extrusion.

5 Claims, 1 Drawing Sheet

USE OF A NI-BASE ALLOY FOR COMPOUND TUBES FOR COMBUSTION PLANTS

BACKGROUND OF THE INVENTION

The present invention relates to the use of an austenitic Ni—Cr—Mo—Nb—Fe-based alloy as a construction material for the manufacture of composite tubes with multiple coatings that satisfies demands in regard of high resistance towards chloride-induced and sulphide-induced corrosion, erosion and melt deposits, and that also was good resistance in reducing environments when used as evaporator tubes or superheater tubes in waste incinerators.

Such an external material component has been found advantageous if made out of a tube hollow that is made on the basis of the so-called Osprey-process which has been subjected to co-extrusion to a final tube where the inner tube component is a carbon steel or a low-alloy Cr—Mo-steel or any other approved standard boiler steel such as SS2352 (18.3 Cr, 10.1 Ni).

Composite tube means a tube consisting of two layer components which have a metallurgical bonding between themselves. Osprey-process means a process for tube fabrication wherein finely distributed drops of the metal is spray deposited on to the inner component in melt condition but which solidifies shortly afterwards. The composite tube is then fabricated by joint extrusion.

Evaporator tubes are those tubes in the incinerator where feeding water is heated by the heat from the combustion gases and which are being evaporated to the temperature that is given by the pressure in the tube.

Super-heater tubes are those tubes in the boiler where the steam is subject of overheating from the heat that comes from the combustion gases.

The tube solutions that today are primarily used for evaporator and super-heater tubes in waste incinerators are non-protected, or are tubing of carbon steel or low-alloy Cr—Mo-steel covered by stamp mass. Other types of protection means are blocks or shields made of ceramic or metallic material. Alternatively, those tubes could be covered by metal atomized layers or weld overlays on the tubes with more highly alloyed material with higher resistance.

The disadvantages observed with these alternatives are too short life times. Stamp masses come apart and cause free exposure of the tubes to gas attacks, whereby the ceramic or metallic shields get insufficient cooling and are rapidly subjected to corrosion and demand frequent maintenance. The weld overlays are being mixed up with the tube material and thereby are impairing corrosion properties. The iron content increases some 10% which promotes damaging iron chlorides to be formed in those tubes. Porosity, cracks or insufficient bonding at the interface between the weld overlay and the tube of carbon steel or low-alloy Cr—Mo-steel causes a risk that on welded/metallized layers will be subject of corrosion or come apart and thereby expose the underlying material for corrosion.

OBJECTS AND SUMMARY OF THE INVENTION

It is an object of this invention to avoid or alleviate the problems of the prior art.

It is also an object of this invention to provide a composite tube useful in particularly difficult environments.

In accordance with one aspect of the invention, there is provided a composite tube for use in superheater environments and waste incinerators comprising an outer layer of an austenitic Ni—Cr—Mo—Nb—Fe-alloy having an analysis in weight-% of

| | |
|---|---|
| carbon | max 0.10 |
| phosphorus | max 0.015 |
| sulphur | max 0.015 |
| chromium | 20.0–23.0 |
| molybdenum | 8.0–10.0 |
| silicon | max 0.50 |
| manganese | max 0.50 |
| niobium + tantalum | 0.1–4.15 |
| iron | 0.5–5.0 |
| aluminum | max 0.40 |
| titanium | max 0.40 |
| nickel | remainder (except usual impurities) | whereby said alloy is formed onto the surface of an inner tube component such that a metallurgical bond is obtained therebetween.

In accordance with another aspect of the invention, there is provided in a composite superheater or evaporator tube used in waste incinerators at 250° C.–600° C., the improvement comprising using the composite tube identified above.

The present invention relates to the use of a Cr—Ni—Mo—Nb—Fe-based alloy with austenitic structure comprising in weight-%:

| | |
|---|---|
| carbon | max 0.10, preferably max 0.02 |
| phosphorus | max 0.015, preferably max 0.01 |
| sulphur | max 0.015, preferably max 0.005 |
| chromium | 20.0–23.0, preferably max 21.0–22.0 |
| molybdenum | 8.0–10.0, preferably max 8.0–9.0 |
| silicon | max 0.50, preferably max 0.4 |
| manganese | max 0.50, preferably max 0.4 |
| niobium + tantalum | 0.1–4.15, preferably max 3.15–4.15 |
| iron | 0.5–5.0, preferably max 0.5–3.0 |
| aluminum | max 0.40, preferably max 0.05 |
| titanium | max 0.40, preferably max 0.25 |
| nickel | remainder (except usual impurities) | whereby said alloy being the outer component of a composite tube made by joint extrusion fabricated by spraying finely distributed metal drops of the outer component on the inner component whereby said inner component is of a conventional carbon steel or a low-alloy Cr—Mo-steel.

BRIEF DESCRIPTION OF THE FIGURES

Further details and advantages of the invention will appear in the following description wherein.

DETAILED DESCRIPTION OF PREFERRED EMBODIMENTS OF THE INVENTION

According to the invention it has been found possible to use a special fabrication method for compound tubes that satisfies those requirements for construction materials used in evaporators and superheaters in waste incinerators. Those requirements that must be satisfied are good resistance towards chloride induced and sulphur induced corrosion and good resistance towards erosion and melted deposits as well as reducing environments.

Figure 1:
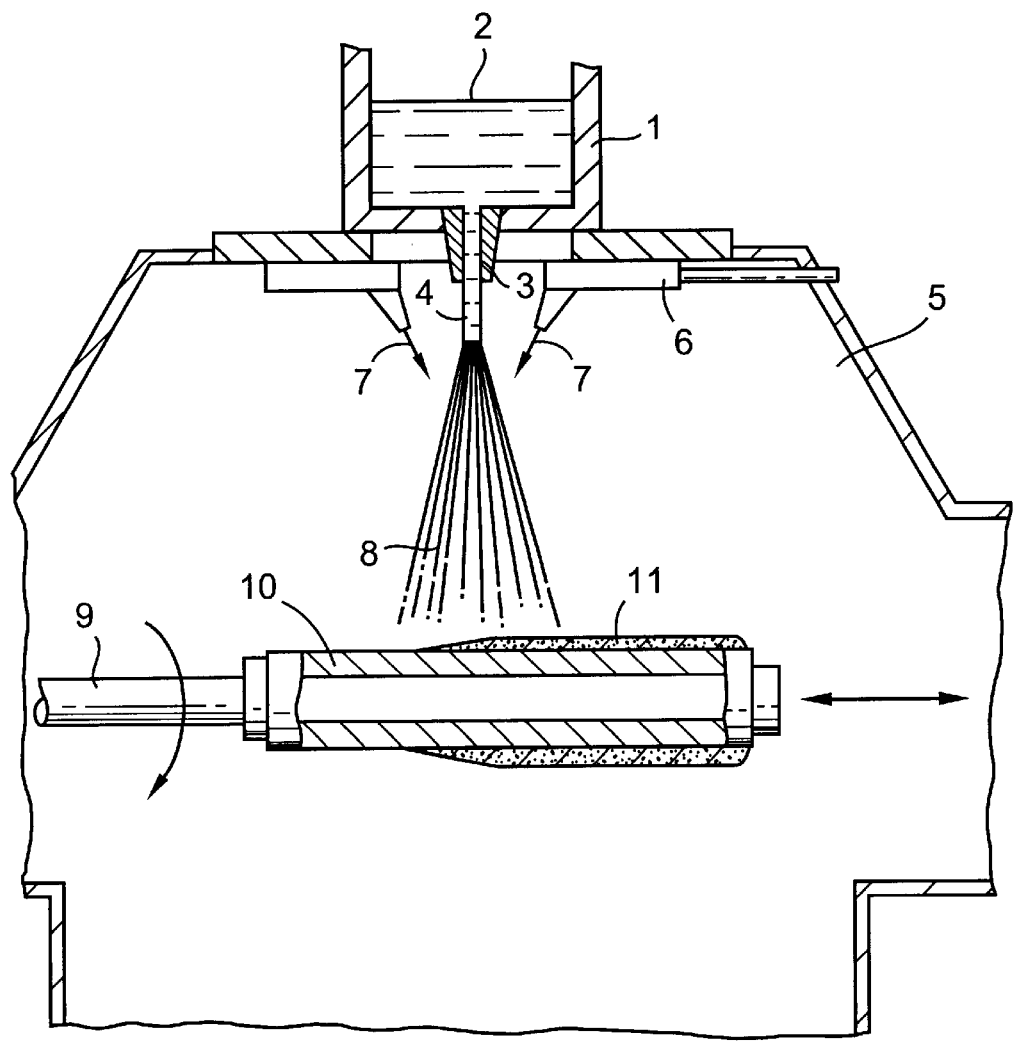
FIG. 1 is a schematic view of an Osprey process equipment.

The equipment shown in FIG. 1 comprises a tundish 1 intended to be partially filled with melted metal or alloy material 2. The tundish is provided with a nozzle 3 in order to provide a stream 4 of melted metal or metal alloy, with desirable diameter. The metal stream 4 is then poured into a chamber 5 whereby a distribution device 6 with gas 7 is arranged to provide a multiple gas stream with high velocity to be directed against the melted metal stream 4 in order to break up said stream 4 into a spray-deposit of finely distributed droplets 8. Further, an additional spray deposit unit for floating argon or nitrogen (not shown) could be provided downstream along said melt stream 4 at a certain distance below said first distribution device 6 in order to ensure a desirable degree of solidification of the finely distributed metal droplets that are being formed from said stream 4.

Inside the chamber 5, at a suitable distance below the exit of the tundish 1, there is provided a horizontally extending bar or tube 10 of carbon steel or low-alloy. Cr—Mo-steel. The bar or tube 10 is both longitudinally displaceable and rotatably arranged in the chamber 5 so that an oscillating axial displacement is achieved. This enables the deposition of finely distributed droplets of the metal alloy 2 on to the mantle surface of said bar or tube 10 so that these will solidify soon after the spray deposition to the formation of a coating 11 around said bar or tube 10. By using this special fabrication technique for making compound tubes, and by using this type of nickel based alloy defined above the outer component, it has been found possible to achieve an improved combination of properties of tubes which shall be exposed to the special environment that exists in super-heaters and evaporators in waste incinerators. Hence, it has been found possible to achieve very good resistance to high temperature corrosion after tests carried out in a realistic super-heater environment at a material temperature of 400° C.–500° C. as well as in field tests in waste incinerators at 350° C.–450° C. Further, no tendency of stress corrosion in compound tubes according to the invention is expected to occur at the exposure thereof to sulphur-induced corrosive environments at 250° C.–600° C., preferably 350° C.–600° C. The above described so-called Osprey-technology results in obtaining compound tubes where inner and outer tube components can have a very good metallurgical bond there between which is of advantage for the heat conductivity through the tube wall and for the strength of the tube. A good conductivity together with high strength and a good metallurgical bond are demands that must be satisfied in a tube consisting of two layers in order to enable such tube to useful at those temperatures that exist in a waste incinerator. Otherwise such tubes will cause big problems by flaking caused by insufficient cooling of the surface exposed to the hot smoke gases and could cause deformation of the stainless tube components which is caused by its larger thermal coefficient of length expansion. Hence, an efficient metallurgical bond between the tube components is necessary for a tube consisting of two components in order to be useful in a super-heater or evaporator.

Figure 2:
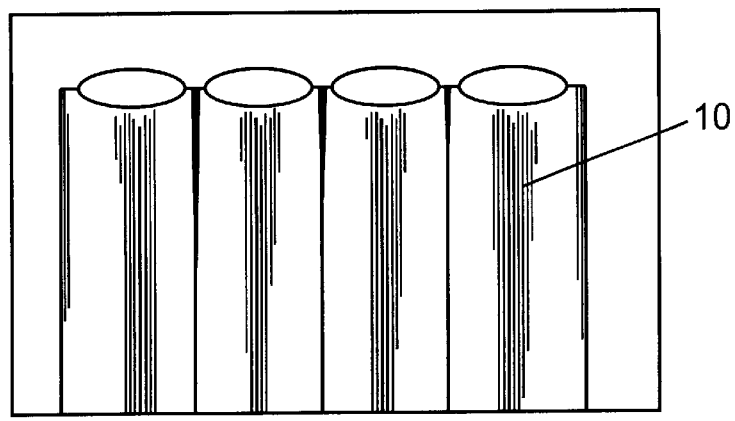
FIG. 2 is a typical appearance of super-heater tubes and evaporator tubes.

The evaporator tubes shown in FIG. 2 represent an example of tubes that are made as described in the foregoing.

The invention is additionally illustrated in connection with the following Examples which are to be considered as illustrative of the present invention. It should be understood, however, that the invention is not limited to the specific details of the Examples.

EXAMPLES

When tests have been carried out in industrial waste incinerator environments, compound tubes made according to the invention have been found to have properties which are better than those alloys used heretofore for same applications. At tests carried out in a large waste incinerator, the inner component was in ordinary carbon steel and the outer tube component was made by an alloy marketed under the trademark SANICRO (UNSN 08028) with an analysis of 0.45 Si, 1.75 Mn, 26.7 Cr, 30.5 Ni, 3.3 Mo, 1 Cu, <0.02 C and the remainder Fe (except usual impurities). After having been made according to the invention with a metallurgical bond between inner and outer components, substantial improvements were achieved in terms of lifetime. The results are given in Table 1.

TABLE 1

| Material (outer tube) | Remaining thickness (mm/1000 h) | |
| --- | --- | --- |
| | 5400 h | 7890 h |
| Ni-Cr-Mo-Nb-Fe-alloy acc to the invention | <0.01 | <0.01 |
| SANICRO 28 | 0.37 | |

As appears herefrom, the tube made in accordance with the invention was almost unaffected even after an exposure during 7890 and 5400 hours respectively whereas the SANICRO-tube had been subject of corrosion more than 2 mm after 5400 hours which corresponds with 0.37 mm/1000 hours.

The preferred analysis for the outer tube component of a composite tube of the invention should have following analysis:

| | |
| --- | --- |
| carbon | max 0.02 |
| phosphorus | max 0.01 |
| sulphur | max 0.005 |
| chromium | 21.0–22.0 |
| molybdenum | 8.0–9.0 |
| silicon | max 0.4 |
| manganese | max 0.4 |
| niobium + tantalum | 3.15–4.15 |
| iron | 0.5–3.0 |
| aluminum | max 0.05 |
| titanium | max 0.25 |
| nickel | remainder (except usual impurities) |

The principles, preferred embodiments and modes of operation of the present invention have been described in the foregoing specification. The invention which is intended to be protected herein, however, is not to be construed as limited to te particular forms disclosed, since these are to be regarded as illustrative rather than restrictive. Variations and changes may be made by those skilled in the art without departing from the spirit of the invention.

What is claimed is:

1. A composite tube for use in superheater environments and waste incinerators comprising:

an inner layer;

an outer layer of an austenitic Ni—Cr—Mo—Nb—Fe-alloy having a composition in weight-% of

| | |
| --- | --- |
| carbon | max 0.10 |
| phosphorus | max 0.015 |
| sulphur | max 0.015 |

-continued

| | |
|---|---|
| chromium | 20.0–23.0 |
| molybdenum | 8.0–10.0 |
| silicon | max 0.50 |
| manganese | max 0.50 |
| niobium + tantalum | 0.1–4.15 |
| iron | 0.5–5.0 |
| aluminum | max 0.40 |
| titanium | max 0.40 |
| nickel | remainder [(except usual impurities)]; and | a metallurgical bond between the inner layer and the outer layer, the metallurgical bond comprising solidified finely distributed metal droplets.

2. The composite tube of claim 1 wherein the inner tube component is carbon steel or a low-alloy Cr—Mo-steel.

3. The composite tube of claim 1 wherein the outer component is deposited onto the surface of the inner component as finely distributed metal droplets.

4. The composite tube of claim 1 wherein the alloy of the outer tube comprises in weight-%

| | |
|---|---|
| carbon | max 0.02 |
| phosphorus | max 0.01 |
| sulphur | max 0.005 |
| chromium | 21.0–22.0 |
| molybdenum | 8.0–9.0 |
| silicon | max 0.4 |
| manganese | max 0.4 |
| niobium + tantalum | 3.15–4.15 |
| iron | 0.5–3.0 |
| aluminum | max 0.05 |
| titanium | max 0.25 |
| nickel + impurities | remainder [(except usual impurities)]; and |

5. In a composite superheater or evaporator tube used in waste incinerators at 250° C.–600° C., the improvement comprising using the composite tube of claim 1.

* * * * *